US008115021B2

(12) United States Patent
Tupy et al.

(10) Patent No.: US 8,115,021 B2
(45) Date of Patent: Feb. 14, 2012

(54) METHOD OF MAKING HYDROGENATED METATHESIS PRODUCTS

(75) Inventors: Michael John Tupy, Crystal, MN (US); Francis Amore, Plymouth, MN (US); Hiroki Kaido, Eden Prairie, MN (US); Xiangsheng Meng, Chanhassen, MN (US)

(73) Assignee: Elevance Renewable Sciences, Inc., Bolingbrook, IL (US)

( * ) Notice: Subject to any disclaimer, the term of this patent is extended or adjusted under 35 U.S.C. 154(b) by 110 days.

(21) Appl. No.: 12/170,818

(22) Filed: Jul. 10, 2008

(65) Prior Publication Data
US 2009/0048459 A1    Feb. 19, 2009

Related U.S. Application Data

(63) Continuation of application No. PCT/US2007/000610, filed on Jan. 10, 2007.

(60) Provisional application No. 60/757,761, filed on Jan. 10, 2006.

(51) Int. Cl.
*C07C 51/36* (2006.01)

(52) U.S. Cl. ........................................................ 554/146

(58) Field of Classification Search .................... 554/146
See application file for complete search history.

(56) References Cited

U.S. PATENT DOCUMENTS

| 2,619,422 | A | 11/1952 | Whiting |
| 3,448,178 | A | 6/1969 | Flanagan |
| 3,896,053 | A | 7/1975 | Broecker et al. |
| 4,634,606 | A | 1/1987 | Skogg |
| 5,043,485 | A | 8/1991 | Fleckenstein et al. |
| 5,142,072 | A | 8/1992 | Stipp et al. |
| 5,312,940 | A | 5/1994 | Grubbs et al. |
| 5,506,363 | A | 4/1996 | Grate et al. |
| 5,639,526 | A | 6/1997 | Kotsiopoulos et al. |
| 5,700,516 | A | 12/1997 | Sandvick et al. |
| 5,710,298 | A | 1/1998 | Grubbs et al. |
| 5,728,785 | A | 3/1998 | Grubbs et al. |
| 5,728,917 | A | 3/1998 | Grubbs et al. |
| 5,734,070 | A | 3/1998 | Tacke et al. |
| 5,750,815 | A | 5/1998 | Grubbs et al. |
| 5,811,515 | A | 9/1998 | Grubbs et al. |
| 5,831,108 | A | 11/1998 | Grubbs et al. |
| 5,849,851 | A | 12/1998 | Grubbs et al. |
| 5,880,231 | A | 3/1999 | Grubbs et al. |
| 5,917,071 | A | 6/1999 | Grubbs et al. |
| 5,922,863 | A | 7/1999 | Grubbs et al. |
| 5,939,504 | A | 8/1999 | Woodson, Jr. et al. |
| 5,969,170 | A | 10/1999 | Grubbs et al. |
| 5,977,393 | A | 11/1999 | Grubbs et al. |
| 6,020,443 | A | 2/2000 | Woodson, Jr. et al. |
| 6,040,363 | A | 3/2000 | Warner et al. |
| 6,063,144 | A | 5/2000 | Calzada et al. |
| 6,080,826 | A | 6/2000 | Grubbs et al. |
| 6,107,420 | A | 8/2000 | Grubbs et al. |
| 6,169,198 | B1 | 1/2001 | Fischer et al. |
| 6,197,894 | B1 | 3/2001 | Sunaga et al. |
| 6,211,315 | B1 | 4/2001 | Larock et al. |
| 6,214,918 | B1 | 4/2001 | Johnson et al. |
| 6,215,019 | B1 | 4/2001 | Pederson et al. |
| 6,224,641 | B1 | 5/2001 | Matzat et al. |
| 6,255,375 | B1 | 7/2001 | Michelman |
| 6,262,153 | B1 | 7/2001 | Webster et al. |
| 6,281,163 | B1 | 8/2001 | Van Dijk |
| 6,284,007 | B1 | 9/2001 | Tao |
| 6,284,852 | B1 | 9/2001 | Lynn et al. |
| 6,306,988 | B1 | 10/2001 | Grubbs et al. |
| 6,310,121 | B1 | 10/2001 | Woodson, Jr et al. |
| 6,316,380 | B1 | 11/2001 | Nolan et al. |
| 6,323,296 | B1 | 11/2001 | Warner et al. |
| 6,376,690 | B1 | 4/2002 | Grubbs et al. |
| 6,409,875 | B1 | 6/2002 | Giardello et al. |
| 6,410,110 | B1 | 6/2002 | Warner et al. |
| 6,410,666 | B1 | 6/2002 | Grubbs et al. |
| 6,426,419 | B1 | 7/2002 | Grubbs et al. |
| 6,433,101 | B1 | 8/2002 | Woodson et al. |
| 6,465,590 | B1 | 10/2002 | Maughon et al. |
| 6,486,264 | B1 * | 11/2002 | Tsunogae et al. ............ 525/339 |
| 6,503,285 | B1 | 1/2003 | Murphy |

(Continued)

FOREIGN PATENT DOCUMENTS
DE        19956226        5/2001
(Continued)

OTHER PUBLICATIONS

Maynard et al, Tetrahedron Letters, vol. 40, #22, pp. 4137-4340, 1999.*

(Continued)

*Primary Examiner* — Deborah D Carr
(74) *Attorney, Agent, or Firm* — Brinks Hofer Gilson & Lione

(57) ABSTRACT

Disclosed is a method of making hydrogenated metathesis products comprising the steps of: (a) providing a metathesis composition; (b) providing a metathesis catalyst comprising a transition metal; (c) metathesizing at least a portion of the metathesis composition in the presence of the metathesis catalyst to form a first composition comprising one or more metathesis products and a transition metal; (d) hydrogenating at least a portion of the first composition in the presence of a hydrogenation catalyst to form a second composition comprising one or more hydrogenated metathesis products, transition metal, and hydrogenation catalyst; and (e) removing at least a portion of the hydrogenation catalyst from the second composition, wherein the removal of the hydrogenation catalyst removes at least a portion of the transition metal of the metathesis catalyst from the second composition.

26 Claims, No Drawings

U.S. PATENT DOCUMENTS

| | | |
|---|---|---|
| 6,525,125 B1 | 2/2003 | Giardello et al. |
| 6,583,236 B1 | 6/2003 | Giardello et al. |
| 6,586,506 B2 | 7/2003 | Webster et al. |
| 6,599,334 B1 | 7/2003 | Anderson |
| 6,610,626 B2 | 8/2003 | Grubbs et al. |
| 6,613,910 B2 | 9/2003 | Grubbs et al. |
| 6,620,955 B1 | 9/2003 | Pederson et al. |
| 6,645,261 B2 | 11/2003 | Murphy et al. |
| 6,696,597 B2 | 2/2004 | Pederson et al. |
| 6,716,155 B2 | 4/2004 | Sleeter |
| 6,730,137 B2 | 5/2004 | Pesu et al. |
| 6,759,537 B2 | 7/2004 | Grubbs et al. |
| 6,770,104 B2 | 8/2004 | Murphy |
| 6,773,469 B2 | 8/2004 | Murphy |
| 6,794,534 B2 | 9/2004 | Grubbs et al. |
| 6,797,020 B2 | 9/2004 | Murphy |
| 6,803,429 B2 | 10/2004 | Morgan et al. |
| 6,818,586 B2 | 11/2004 | Grubbs et al. |
| 6,824,572 B2 | 11/2004 | Murphy |
| 6,838,489 B2 | 1/2005 | Bell et al. |
| 6,846,573 B2 | 1/2005 | Seydel |
| 6,884,859 B2 | 4/2005 | Grubbs et al. |
| 6,900,347 B2 | 5/2005 | Paulson et al. |
| 6,921,735 B2 | 7/2005 | Hoveyda et al. |
| 6,921,736 B1 | 7/2005 | Nolan et al. |
| 6,946,533 B2 | 9/2005 | Grubbs et al. |
| 6,962,729 B2 | 11/2005 | Tokas et al. |
| 6,987,154 B2 | 1/2006 | Choi et al. |
| 7,026,495 B1 | 4/2006 | Pederson et al. |
| 7,034,096 B2 | 4/2006 | Choi et al. |
| 7,109,348 B1 | 9/2006 | Nolan |
| 7,119,216 B2 | 10/2006 | Newman et al. |
| 7,128,766 B2 | 10/2006 | Murphy et al. |
| 7,176,336 B2 | 2/2007 | Maughon et al. |
| 7,192,457 B2 | 3/2007 | Murphy et al. |
| 7,205,424 B2 | 4/2007 | Nolan |
| 7,217,301 B2 | 5/2007 | Murphy et al. |
| 7,285,593 B1 | 10/2007 | Giardello et al. |
| 7,314,904 B2 | 1/2008 | Nadolsky et al. |
| 7,329,758 B1 | 2/2008 | Grubbs et al. |
| 7,365,140 B2 | 4/2008 | Piers et al. |
| 7,462,205 B2 | 12/2008 | Murphy |
| 7,507,854 B2 | 3/2009 | Lee et al. |
| 7,598,330 B2 | 10/2009 | Grubbs et al. |
| 7,622,590 B1 | 11/2009 | Nolan et al. |
| 7,812,185 B2 | 10/2010 | Burdett et al. |
| 2001/0051680 A1 | 12/2001 | Webster et al. |
| 2002/0095007 A1 | 7/2002 | Larock et al. |
| 2002/0157303 A1 | 10/2002 | Murphy et al. |
| 2003/0017431 A1 | 1/2003 | Murphy |
| 2003/0046860 A1 | 3/2003 | Tiffany et al. |
| 2003/0055262 A1 | 3/2003 | Grubbs et al. |
| 2003/0057599 A1 | 3/2003 | Murphy et al. |
| 2003/0061760 A1 | 4/2003 | Tao et al. |
| 2003/0091949 A1 | 5/2003 | Pesu et al. |
| 2003/0100776 A1 | 5/2003 | Grubbs et al. |
| 2003/0110683 A1 | 6/2003 | Murphy |
| 2003/0186035 A1 | 10/2003 | Cruce et al. |
| 2003/0198826 A1 | 10/2003 | Seydel |
| 2003/0207971 A1 | 11/2003 | Stuart, Jr. et al. |
| 2003/0236377 A1 | 12/2003 | Choi et al. |
| 2004/0047886 A1 | 3/2004 | Murphy et al. |
| 2004/0088907 A1 | 5/2004 | Murphy |
| 2004/0088908 A1 | 5/2004 | Murphy |
| 2004/0200136 A1 | 10/2004 | Tao et al. |
| 2004/0221503 A1 | 11/2004 | Murphy et al. |
| 2004/0221504 A1 | 11/2004 | Murphy |
| 2005/0014664 A1 | 1/2005 | Nadolsky et al. |
| 2005/0027136 A1 | 2/2005 | Toor et al. |
| 2005/0060927 A1 | 3/2005 | Murphy |
| 2005/0070750 A1 | 3/2005 | Newman et al. |
| 2005/0080301 A1 | 4/2005 | Maughon et al. |
| 2005/0123780 A1 | 6/2005 | Seydel |
| 2005/0154221 A1 | 7/2005 | Lysenko et al. |
| 2005/0158679 A1 | 7/2005 | Chen et al. |
| 2005/0261451 A1 | 11/2005 | Ung et al. |
| 2005/0269728 A1 | 12/2005 | Roos |
| 2006/0079704 A1 | 4/2006 | Lacombe et al. |
| 2006/0128912 A1 | 6/2006 | Piers et al. |
| 2006/0236593 A1 | 10/2006 | Cap |
| 2006/0272199 A1 | 12/2006 | Licciardello et al. |
| 2006/0272200 A1 | 12/2006 | Murphy et al. |
| 2007/0006522 A1 | 1/2007 | Tao |
| 2007/0039237 A1 | 2/2007 | Murphy et al. |
| 2007/0144058 A1 | 6/2007 | Chen et al. |
| 2007/0151480 A1 | 7/2007 | Bloom et al. |
| 2007/0270621 A1 | 11/2007 | Millis et al. |
| 2007/0282000 A1 | 12/2007 | Murphy et al. |
| 2008/0027194 A1 | 1/2008 | Schrodi |
| 2008/0064891 A1 | 3/2008 | Lee |
| 2009/0048459 A1 | 2/2009 | Tupy et al. |
| 2009/0126602 A1 | 5/2009 | Murphy et al. |
| 2009/0217568 A1 | 9/2009 | Murphy et al. |
| 2009/0220443 A1 | 9/2009 | Braksmayer et al. |
| 2009/0259065 A1 | 10/2009 | Abraham et al. |
| 2009/0264672 A1 | 10/2009 | Abraham et al. |
| 2010/0047499 A1 | 2/2010 | Braksmayer et al. |
| 2010/0094034 A1 | 4/2010 | Kaido et al. |
| 2010/0145086 A1 | 6/2010 | Schrodi et al. |

FOREIGN PATENT DOCUMENTS

| | | | |
|---|---|---|---|
| EP | 429995 A2 | | 6/1991 |
| EP | 1408064 | * | 4/2004 |
| EP | 1408064 A1 | * | 4/2004 |
| FR | 2878246 A1 | | 5/2006 |
| JP | 56077243 | | 6/1981 |
| JP | 09014574 | | 1/1997 |
| SU | 1565872 | | 5/1990 |
| WO | WO 94/23836 A1 | | 10/1994 |
| WO | WO 96/04289 | | 2/1996 |
| WO | WO 00/46565 | | 8/2000 |
| WO | WO 01/36368 | | 5/2001 |
| WO | WO 03/018905 | | 3/2003 |
| WO | WO 03/057983 | | 7/2003 |
| WO | WO 03/093215 | | 11/2003 |
| WO | WO 03/104348 | | 12/2003 |
| WO | WO 2004/033388 | | 4/2004 |
| WO | WO 2004/062763 | | 7/2004 |
| WO | WO 2004/083310 | | 9/2004 |
| WO | WO 2005/026106 | | 3/2005 |
| WO | WO 2005/042655 | | 5/2005 |
| WO | WO 2005/080455 | * | 9/2005 |
| WO | WO 2006/052688 | | 5/2006 |
| WO | WO 2006/076364 | | 7/2006 |
| WO | WO 2007/002999 | | 1/2007 |
| WO | WO 2007/081987 | | 7/2007 |
| WO | WO 2007/103398 | | 9/2007 |
| WO | WO 2008/046106 A2 | | 4/2008 |
| WO | WO 2008/048522 A1 | | 4/2008 |
| WO | WO 2008/063322 A2 | | 5/2008 |

OTHER PUBLICATIONS

Anderson et al., "Synthesis and Reactivity of Olefin Metathesis Catalysts Bearing Cyclic (Alkyl)(Amino) Carbenes," Angewandte Chemie International Edition, vol. 46, 2007, pp. 7262-7265.

Baumann et al., "Natural Fats and Oils—Renewable Raw Materials for the Chemical Industry," Angewandte Chemie International Edition in English, vol. 27, 1988, pp. 41-62.

Biermann et al., "New Syntheses with Oils and Fats as Renewable Raw Materials for the Chemical Industry,", Angewandte Chemie International Edition, vol. 39, 2000, pp. 2206-2224.

Boelhouwer et al., "Metathesis Reactions of Fatty Acid Esters," Progress of Lipid Research, Pergamon Press, vol. 24, No. 3, 1985, pp. 243-267.

Choi et al., "Olefin Metathesis Involving Ruthenium Enoic Carbene Complexes," Journal of the American Chemical Society, vol. 123, No. 42, 2001, pp. 10417-10418.

Connon et al., "A Solid-Supported Phosphine-Free Ruthenium Alkylidene for Olefin Metathesis in Methanol and Water," Bioorganic & Medical Chem Letters, vol. 12, No. 14, 2002, pp. 1873-1876.

Dunne et al., "A Highly Efficient Olefin Metathesis Initiator: Improved Synthesis and Reactivity Studies," Tetrahedron Letters, vol. 44, No. 13, 2003, pp. 2733-2736.

Erhan et al., "Drying Properties of Metathesized Soybean Oil," Journal of American Oil Chemists' Society, AOCS Press, vol. 74, No. 6, 1997, pp. 703-706.

Feuge et al., "1,3-Diolein and 1,3-Distearin Esters of Fumaric, Succinic and Adipic Acids," Journal of American Chemical Society, vol. 80, 1958, pp. 6338-6341.

Lavallo, "Stable Cyclic (Alkyl)(Amino) Carbenes as Rigid or Flexible, Bulky, Electron-Rich Ligands for Transition-Metal Catalysts: A Quaternary Carbon Atom Makes the Difference," Angewandte Chemie Int. Ed., vol. 44, 2005, pp. 5705-5709.

Maynard et al., "Purification Technique for the Removal of Ruthenium from Olefin Metathesis Reaction Products," Tetrahedron Letters, vol. 40, No. 22, 1999, pp. 4137-4140.

Mol, "Applications of Olefin Metathesis in Oleochemistry: An Example of Green Chemistry," Green Chemistry, Royal Society of Chemistry, Cambridge, GB, vol. 4, 2002, pp. 5-13.

Mol et al., "Metathesis in Oleochemistry," J Braz Chem Soc, vol. 9, No. 1, 1998, pp. 1-11.

Mol, "Catalytic Metathesis of Unsaturated Fatty Acid Esters and Oils," Topics in Catalysis, vol. 27, No. 1-4, 2004, pp. 97-104.

Refvik et al., "Ruthenium-Catalyzed Metathesis of Vegetable Oils," Journal of American Oil Chemists' Society, AOCS Press, vol. 76, No. 1, 1999, pp. 93-98.

Schneider et al., "Synthesis of Highly Substituted Cyclopentane and Tetrahydrofuran Derivatives by Crossed Olefin Metathesis," Angewandte Chemi International Edition, vol. 35, No. 4, 1996, pp. 411-412.

Shorland, "Glycol Esters of Dibasic Acids. The Di-β-hydroxyethyl Esters," Journal of American Chemical Society, vol. 57, No. 1, 1935, pp. 115-116.

Tian et al., "Model Studies and the ADMET Polymerization of Soybean Oil," Journal of American Oil Chemists' Society, AOCS Press, vol. 79, No. 5, 2002, pp. 479-488.

Ward et al., "New Fat Products: Glyceride Esters of Adipic Acid," Journal of the Amiercan Oil Chemists' Society, vol. 36, 1959, pp. 667-671.

International Search Report and Written Opinion of the International Searching Authority for International Application No. PCT/US2006/000822, dated Jul. 14, 2006, 13 pages.

International Search Report for International Application No. PCT/US2007/015905, dated Apr. 23, 2008, 3 pages.

International Search Report and Written Opinion of the International Searching Authority for International Application No. PCT/US2007/00610, dated Oct. 11, 2007, 8 pages.

International Search Report and Written Opinion of the International Searching Authority for International Application No. PCT/US2007/005736, dated Aug. 8, 2007, 11 pages.

International Search Report and Written Opinion of the International Searching Authority for International Application No. PCT/US2007/005868, dated Nov. 9, 2007, 7 pages.

International Search Report for International Application No. PCT/US2007/015866, dated Nov. 26, 2007, 3 pages.

International Search Report for International Application No. PCT/US2007/016010, dated Mar. 11, 2008, 4 pages.

International Search Report for International Application No. PCT/US2007/021931, dated Apr. 11, 2008, 3 pages.

International Search Report for International Application No. PCT/US2007/021934, dated Jun. 17, 2008, 3 pages.

International Search Report for International Application No. PCT/US2007/021939, dated Feb. 18, 2008, 2 pages.

International Search Report and Written Opinion of the International Searching Authority for International Application No. PCT/US2008/009604, dated Oct. 27, 2008, 6 pages.

International Search Report and Written Opinion of the International Searching Authority for International Application No. PCT/US2008/009635, dated Oct. 27, 2008, 7 pages.

International Search Report for International Application No. PCT/US2008/065395, dated Sep. 29, 2008, 1 page.

International Search Report for International Application No. PCT/US2008/067025, dated Sep. 8, 2008, 1 page.

Refvik, M.D. et al., "The Chemistry of Metathesized Soybean Oil," JAOCS, vol. 76, No. 1, 1999, pp. 99-102.

\* cited by examiner

METHOD OF MAKING HYDROGENATED METATHESIS PRODUCTS

CROSS-REFERENCE TO RELATED APPLICATIONS

This application is a continuation application of International Patent Application No. PCT/US2007/000610, filed on Jan. 10, 2007 which claims the benefit of priority to U.S. Provisional Application No. 60/757,761, filed Jan. 10, 2006, the disclosure of which is incorporated herein by reference in its entirety.

BACKGROUND

Metathesis is a catalytic reaction and involves the interchange of alkylidene units among olefinic hydrocarbons via the formation and cleavage of carbon-carbon double bonds. The metathesis reaction may occur between two of the same type of molecules, referred to as self-metathesis, and/or may occur between two dissimilar types of molecules, referred to as cross-metathesis. Metathesis is a well-known and useful synthetic step in the production of industrial chemicals.

Metathesis reactions are typically catalyzed by transition metal carbene complexes, for example, complexes comprising ruthenium, molybdenum, osmium, chromium, rhenium, or tungsten. Upon completion of the metathesis reaction it is typically desirable to remove at least a portion of the metathesis catalyst from the metathesis products.

In one known method for removing metathesis catalyst, tris-(hydroxymethyl)phosphine (THMP) is added to the metathesis products at a rate of about 25 to 100 mol equivalents THMP per mole of metathesis catalyst. The resulting mixture is then stirred at a temperature of about 60° C. to 70° C. for about 18 to 24 hours under inert atmosphere (e.g., N2 gas). Degassed water or methanol (e.g., about 150 mL per L of reaction mixture) is then added and stirred for about 10 minutes. The mixture is then centrifuged to provide phase separation. The THMP complexes with the metathesis catalyst allowing it to be removed by separation of the water or methanol phase.

In a variation to this method (see, Maynard and Grubbs, Tetrahedron 1999, 40, 4137-4140) triethylamine is added along with THMP to the metathesis products, followed by treatment with an excess of silica gel and filtration. A level of 206 ppm Ru in the product is reported.

In another reported method (see, Paquette et. al. Organic Letters 2000, 2(9), 1259-1261), 1.5 equivalents of lead tetraacetate is added to the reaction mixture and stirred overnight, followed by filtration through a pad of silica gel. A level of 300 ppm of Ru in the product is reported.

In another reported method (see, Ahn et. al.; Organic Letters 2001, 3(9), 1411-1413) 50 equivalents of triphenylphosphine oxide or dimethyl sulfoxide is added to the reaction mixture, followed by chromatography on silica gel. A level of 100 ppm Ru in the product is reported.

Other reported methods include the method of Cho and Kim (see, Organic Letters 2003, 5(4), 531-533) (reports treatment of the reaction mixture with silica and at least 50 equivalents of carbon, followed by column chromatography on silica gel. A level of 12 ppm Ru in the product is reported.); the method of Westhus et. al. (see, Tetrahedron Letters 2004, 45, 3141-3142) (reports the use of a polymer-bound chelate phosphine, optionally followed by treatment with silica gel or carbon. A level of 1120 to 2400 ppm is reported.); the method reported in WO 2003/026770 (reports the use of 360 equivalents of activated alumina, followed by filtration through Celite brand activated charcoal. A level of 9 ppm Ru in the final product is reported.); the method of WO 2005/056182 (reports the use of supercritical $CO_2$ to precipitate the catalyst. A level of 56 ppm Ru in the final product is reported.); and the method reported in WO 2005/075502 (reports the use of dithiothreitol, dithioerythritol, or citric acid, followed by extraction with water and aqueous base, and finally treatment with charcoal. A level of 210 to 310 ppm Ru in the final product is reported.).

Often, metathesis is followed by hydrogenation, whereby at least a portion of the double bond(s) that are present in the metathesis products are converted to single bonds. When metathesis is followed by hydrogenation, the metathesis catalyst is conventionally removed after the metathesis reaction but before the hydrogenation reaction. Although the removal of catalyst can be accomplished using known methods, the catalyst removal process adds a step to the manufacturing process with an associated material cost, processing cost, and yield loss. What is desired is a method of removing the metathesis catalyst (or the transition metal of the metathesis catalyst) that can be accomplished without adding a processing step to the manufacturing route of a chemical compound.

SUMMARY

The invention provides an improved method of making hydrogenated metathesis products. Advantageously, the method does not require a separate step to remove or reduce the level of transition metal that is present in the hydrogenated metathesis products due to the metathesis catalyst. Although not wishing to be bound by theory, it is believed that the hydrogenation catalyst in some way binds the transition metal or the metathesis catalyst during the hydrogenation reaction. It is also possible that the hydrogenation reaction converts the metathesis catalyst into a form that is more easily removed. Therefore, removal of the hydrogenation catalyst (e.g., by filtration) after hydrogenation results in the removal of at least a portion of the metathesis catalyst transition metal from the hydrogenated metathesis product.

In one embodiment, the method of the invention comprises the steps of:

(a) providing a metathesis composition;

(b) providing a metathesis catalyst comprising a transition metal;

(c) metathesizing at least a portion of the metathesis composition in the presence of the metathesis catalyst to form a first composition comprising one or more metathesis products and transition metal;

(d) hydrogenating at least a portion of the first composition in the presence of a hydrogenation catalyst to form a second composition comprising one or more hydrogenated metathesis products, transition metal, and hydrogenation catalyst; and (e) removing at least a portion of the hydrogenation catalyst from the second composition, wherein the removal of the hydrogenation catalyst removes at least a portion of the transition metal of the metathesis catalyst from the second composition.

Useful starting compositions for metathesis include petroleum or oleochemical-derived compounds having at least one carbon-carbon double bond. Representative oleochemical-derived starting compositions include polyol esters, for example, polyol esters of unsaturated fatty acids. In some embodiments, the metathesis compositions are triacylglycerides, for example, vegetable oils or animal fats. In an exemplary embodiment, the vegetable oil is refined, bleached and deodorized (RBD) soybean oil.

The metathesis reaction is conducted in the presence of a metathesis catalyst comprising a transition metal, for example, ruthenium, molybdenum, osmium, chromium, rhenium, or tungsten. Useful hydrogenation catalysts are known in the art and comprise nickel, copper, palladium, or platinum. In an exemplary embodiment, the hydrogenation catalyst comprises nickel that has been chemically reduced with hydrogen to an active state and provided on a support of silica or alumina or carbon.

In another aspect, the invention provides hydrogenated metathesis products that are prepared from the method of the invention. In some embodiments, the hydrogenated metathesis products contain about 100 ppm or less of the transition metal of the metathesis catalyst (e.g., ruthenium). In other embodiments, the hydrogenated metathesis products contain about 10 ppm or less of the transition metal of the metathesis catalyst. In an exemplary embodiment, the hydrogenated metathesis product contains about 1 ppm or less of the transition metal of the metathesis catalyst.

The hydrogenated metathesis products may be solid, liquids, oils, or waxes. In an exemplary embodiment, the hydrogenated metathesis products are in the form of a wax comprising hydrogenated metathesized vegetable oil (e.g., soybean oil). The metathesized vegetable oil may be hydrogenated to have an Iodine Value (IV) of about 75 or less, for example, 50 or less or 25 or less.

DETAILED DESCRIPTION

Metathesis Compositions and Products:

Metathesis compositions comprise compounds that contain at least one carbon-carbon double bond that is suitable for a metathesis reaction. Metathesis reactions include, for example, self-metathesis, cross-metathesis, ring-opening metathesis, ring-opening metathesis polymerizations (ROMP), ring-closing metathesis (RCM), and acyclic diene metathesis (ADMET). Examples of metathesis compositions, processes, and products are reported in R. L. Pederson, *Commercial Applications of Ruthenium Metathesis Processes*; in "Handbook of Metathesis"; Vol. 2; R. H. Grubbs Ed.; Wiley-VCH Weinheim, Germany; 2003; pp. 491 to 510 (ISBN No. 3-527-30616-1).

In some embodiments, the metathesis compositions comprise polyol esters of unsaturated fatty acids. The polyol esters typically comprise one or more of monoacylglycerides, diacylglycerides, and triacylglycerides. The polyol esters are derived, for example, from vegetable or animal origin. Representative examples of vegetable oils comprising polyol esters of unsaturated fatty acids include soybean oil (including modified soybeans such as low linolenic varieties), palm oil, palm kernel oil, coconut oil, cocoa butter, corn oil, peanut oil, cottonseed oil, canola oil (including high oleic varieties), sunflower oil (including high oleic varieties), castor oil, safflower oil, tall oil, tung oil, linseed oil, jojoba oil, olive oil, used fry oils from food processing operations, and the like. Representative examples of animal oils include tallow, lard, fish oil, or chicken fat. In an exemplary embodiment, the metathesis composition is refined, bleached, and deodorized (i.e., RBD) soybean oil. The metathesis compositions may include esters of the fatty acids provided by the oils and fats and molecules with a single hydroxy site such as fatty acid methyl esters.

As used herein, "polyol esters" refers to esters produced from polyols. Polyols may include more than two hydroxyl groups. These polyols may comprise from two to about 10 carbon atoms, and may comprise from two to six hydroxyl groups, but other numbers of carbon atoms and/or hydroxyl groups are possible as well. The polyols may contain two to four hydroxyl moieties. Non-limiting examples of polyols include glycerin, 1,2-propanediol, 1,3-propanediol, 1,2-butanediol, 1,3-butanediol, 2,3-butanediol, 2-ethyl-1,3-propanediol, 2-ethyl-2-butyl-1,3-propanediol, neopentyl glycol, 2,2,4-trimethyl-1,3-pentanediol, trimethylolpropane (TMP), sorbitol and pentaerythritol. Very commonly, the polyol esters employed herein are esters of glycerin, e.g., triacylglycerides, or esters of a mixture of glycerin and one or more other polyols.

The polyol ester component may include a partial fatty acid ester of one or more polyols and/or a polyol which is fully esterified with fatty acids ("complete polyol fatty acid ester"). Examples of complete polyol fatty acid esters include triacylglycerides, propylene glycol diesters and tetra esters of pentaerythritol. Examples of suitable polyol partial esters include fatty acid monoglycerides, fatty acid diglycerides and sorbitan partial esters (e.g., diesters and triesters of sorbitan). In some embodiments, the polyol may include from 2 to 6 carbon atoms and 2 to 6 hydroxyl groups. Examples of suitable polyols include glycerol, trimethylolpropane, ethylene glycol, propylene glycol, pentaerythritol, sorbitan and sorbitol.

In some embodiments, the polyol esters are metathesized and hydrogenated to form wax compositions. For example, in one embodiment, refined, bleached and deodorized (RBD) soybean oil is self metathesized in the presence of a metathesis catalyst to form a metathesis product. According to the method of the invention, the resulting metathesis product is then hydrogenated without first removing the metathesis catalyst to form a hydrogenated metathesis product in the form of a wax. Subsequent removal of the hydrogenation catalyst results in removal of at least a portion of the transition metal from the metathesis catalyst. Wax compositions comprising hydrogenated metathesis products are described, for example, in PCT Application No. WO 06/076364, titled CANDLE AND CANDLE WAX CONTAINING METATHESIS AND METATHESIS-LIKE PRODUCTS.

In addition to wax products, the method of the invention may be employed to manufacture other products that are obtainable directly or indirectly via metathesis reactions. Representative examples include polymers, industrial chemicals such as additives (e.g., mono and dicarboxylic acids, surfactants, and solvents) and lubricants, fine chemicals (e.g., insect pheromones, carotenoids, and pharmaceutical intermediates), active pharmaceutical ingredients, agricultural chemicals (e.g., pesticides and herbicides), and the like.

Metathesis Catalysts:

The metathesis reaction is conducted in the presence of a catalytically effective amount of a metathesis catalyst. The term "metathesis catalyst" includes any catalyst or catalyst system which catalyzes the metathesis reaction.

Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. Exemplary ruthenium-based metathesis catalysts include those represented by structures 12 (commonly known as Grubbs's catalyst), 14 and 16, where Ph is phenyl, Mes is mesityl, and Cy is cyclohexyl.

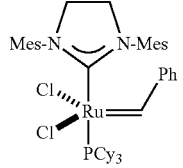

12

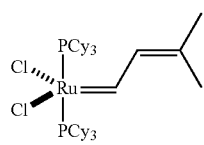

14

16

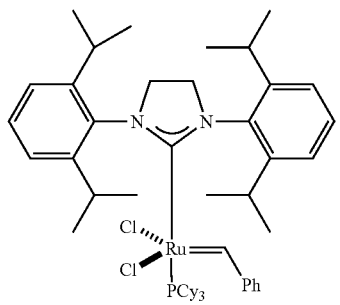

26

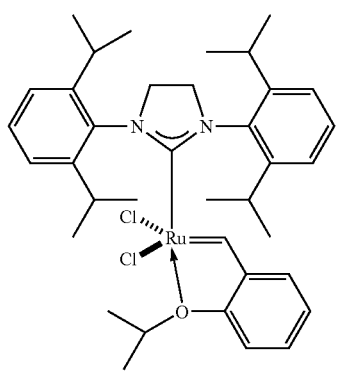

28

Structures 18, 20, 22, 24, 26, and 28, illustrated below, represent additional ruthenium-based metathesis catalysts, where Ph is phenyl, Mes is mesityl, py is pyridine, Cp is cyclopentyl, and Cy is cyclohexyl. Techniques for using catalysts 12, 14, 16, 18, 20, 22, 24, 26, and 28, as well as additional related metathesis catalysts, are known in the art.

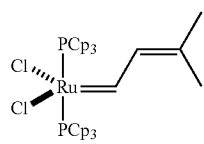

18

Catalysts C627, C682, C697, C712, and C827 are additional ruthenium-based catalysts, where Cy is cyclohexyl in C827.

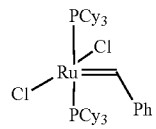

C823

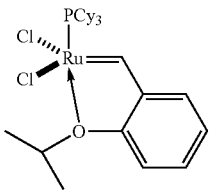

20

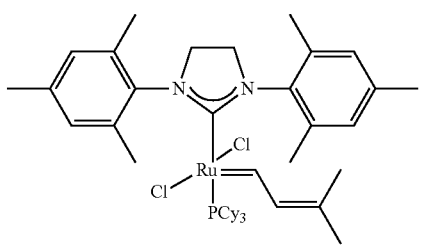

C827

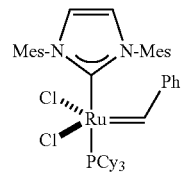

22

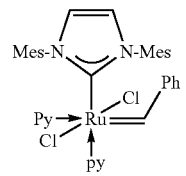

24

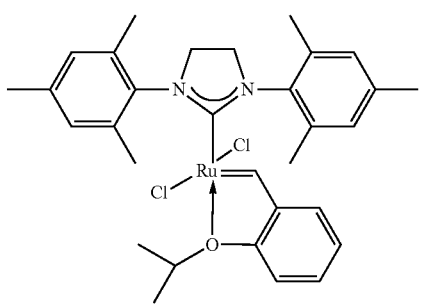

C627

C712

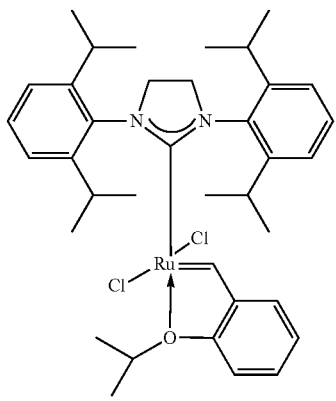

C697

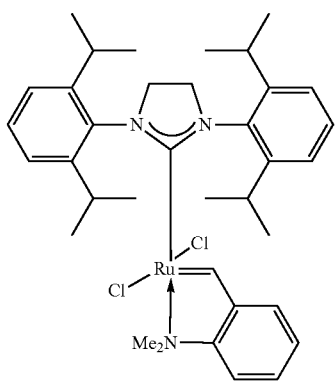

C682

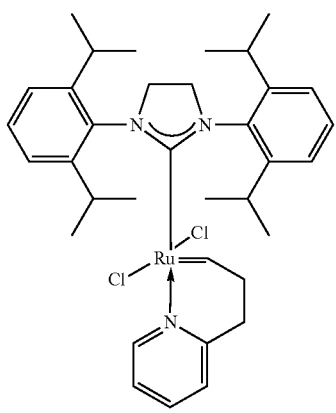

Additional exemplary metathesis catalysts include, without limitation, metal carbene complexes selected from the group consisting of molybdenum, osmium, chromium, rhenium, and tungsten. The term "complex" refers to a metal atom, such as a transition metal atom, with at least one ligand or complexing agent coordinated or bound thereto. Such a ligand typically is a Lewis base in metal carbene complexes useful for alkyne or alkene-metathesis. Typical examples of such ligands include phosphines, halides and stabilized carbenes. Some metathesis catalysts may employ plural metals or metal co-catalysts (e.g., a catalyst comprising a tungsten halide, a tetraalkyl tin compound, and an organoaluminum compound).

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

The metathesis process can be conducted under any conditions adequate to produce the desired metathesis products. For example, stoichiometry, atmosphere, solvent, temperature and pressure can be selected to produce a desired product and to minimize undesirable byproducts. The metathesis process may be conducted under an inert atmosphere. Similarly, if the olefin reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen and combinations thereof.

Similarly, if a solvent is used, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc.

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives may also be present during metathesis that increase catalyst lifetime.

Any useful amount of the selected metathesis catalyst can be used in the process. For example, the molar ratio of the unsaturated polyol ester to catalyst may range from about 5:1 to about 10,000,000:1 or from about 50:1 to 500,000:1.

The metathesis reaction temperature may be a rate-controlling variable where the temperature is selected to provide a desired product at an acceptable rate. The metathesis temperature may be greater than −40° C., may be greater than about −20° C., and is typically greater than about 0° C. or greater than about 20° C. Typically, the metathesis reaction temperature is less than about 150° C., typically less than about 120° C. An exemplary temperature range for the metathesis reaction ranges from about 20° C. to about 120° C.

The metathesis reaction can be run under any desired pressure. The total pressure may be selected to be greater than about 10 kPa, in some embodiments greater than about 30 kP, or greater than about 100 kPa. Typically, the reaction pressure is no more than about 7000 kPa, in some embodiments no more than about 3000 kPa. An exemplary pressure range for the metathesis reaction is from about 100 kPa to about 3000 kPa.

In some embodiments, the metathesis reaction is catalyzed by a system containing both a transition and a non-transition metal component. The most active and largest number of catalyst systems are derived from Group VI A transition metals, for example, tungsten and molybdenum.

Hydrogenation Catalysts:

In some embodiments, the method of the invention utilizes hydrogenation catalysts comprising, for example, nickel, copper, palladium, platinum, molybdenum, iron, ruthenium, osmium, rhodium, or iridium. Combinations of metals may also be used. Useful catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. In some embodiments, the support comprises porous silica (e.g., kieselguhr, infusorial, diatomaceous, or siliceous earth) or alumina. The catalyst are characterized by a high nickel surface area per gram of nickel.

In some embodiments, the particles of supported nickel catalyst are dispersed in a protective medium comprising hardened triacylglyceride, edible oil, or tallow. In an exemplary embodiment, the supported nickel catalyst is dispersed in the protective medium at a level of about 22 wt. % nickel.

In some embodiments, the supported nickel catalysts are of the type reported in U.S. Pat. No. 3,351,566 (Taylor et al.). These catalyst comprise solid nickel-silica having a stabilized high nickel surface area of 45 to 60 sq. meters per gram and a total surface area of 225 to 300 sq. meters per gram. The catalysts are prepared by precipitating the nickel and silicate ions from solution such as nickel hydrosilicate onto porous silica particles in such proportions that the activated catalyst contains 25 to 50 wt. % nickel and a total silica content of 30 to 90 wt %. The particles are activated by calcining in air at 600 to 900 F, then reducing with hydrogen.

Useful catalysts having a high nickel content are described in EP 0 168 091, wherein the catalyst is made by precipitation of a nickel compound. A soluble aluminum compound is added to the slurry of the precipitated nickel compound while the precipitate is maturing. After reduction of the resultant catalyst precursor, the reduced catalyst typically has a nickel surface area of the order of 90 to 150 sq. m per gram of total nickel. The catalysts have a nickel/aluminum atomic ratio in the range of 2 to 10 and have a total nickel content of more than about 66% by weight.

Useful high activity nickel/alumina/silica catalysts are described in EP 0 167 201. The reduced catalysts have a high nickel surface area per gram of total nickel in the catalyst.

Useful nickel/silica hydrogenation catalysts are described in U.S. Pat. No. 6,846,772. The catalysts are produced by heating a slurry of particulate silica (e.g. kieselguhr) in an aqueous nickel amine carbonate solution for a total period of at least 200 minutes at a pH above 7.5, followed by filtration, washing, drying, and optionally calcination. The nickel/silica hydrogenation catalysts are reported to have improved filtration properties.

Also useful are high surface area nickel/alumina hydrogenation catalysts, for example as reported in U.S. Pat. No. 4,490,480. These catalysts typically have a total nickel content of 5 to 40% by weight.

Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936, and "PRICAT 9925" (from Johnson Matthey Catalysts, Ward Hill, Mass.).

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with soybean oil (e.g., RBD soybean oil). The soybean oil may be heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried with a small amount of soybean oil. When the soybean oil reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig, for example, about 40 to about 100 psig. As the gas pressure increases, more specialized high-pressure processing equipment may be required. Under these conditions the hydrogenation reaction begins and the temperature is allowed to increase to the desired hydrogenation temperature, where it is maintained by cooling the reaction mass, for example, with cooling coils. Typically, the hydrogenation temperature ranges from about 20° C. to about 250° C., for example, about 100° C. or greater, or about 120° C. to about 220° C. When the desired degree of hydrogenation is reached, the reaction mass is cooled to the desired filtration temperature.

The amount of hydrogenation catalysts is typically selected in view of a number of factors including, for example, the type of hydrogenation catalyst used, the amount of hydrogenation catalyst used, the degree of unsaturation in the metathesis product, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 wt. % or less, for example, about 5 wt. % or less or about 1 wt. % or less.

Hydrogenation Catalyst Removal Process:

After hydrogenation, the used hydrogenation catalyst is removed from the hydrogenated metathesized product using known techniques such as filtration. In some embodiments, the hydrogenation catalyst is removed using a plate and frame filter such as those commercially available from Sparkle Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 wt. % or less, for example, about 5 wt. % or less or about 1 wt. % or less. Other filtering techniques and filtering aids may also be employed to remove the used hydrogenation catalyst. In other embodiments the hydrogenation catalyst is removed using centrifugation followed by decantation of the product.

After filtering, the hydrogenated metathesis products typically contains less than about 100 ppm of the metathesis catalyst transition metal. In other embodiments, the hydrogenated metathesis products contain less than about 10 ppm of the metathesis catalyst transition metal. In still other embodiments, the hydrogenated metathesis products contain less than about 1 ppm of the metathesis catalyst transition metal, for example, about 0.9 ppm or less, about 0.8 ppm or less, about 0.7 ppm or less, about 0.6 ppm or less, about 0.5 ppm or less, about 0.4 ppm or less, about 0.3 ppm or less, or about 0.1 ppm or less. In exemplary embodiments, the metathesis catalyst is a ruthenium-based catalyst and the hydrogenated metathesis product contains less than about 0.1 ppm ruthenium.

The following examples are presented to illustrate the present invention and to assist one of ordinary skill in making and using the same. The examples are not intended in any way to limit the scope of the invention.

EXAMPLES

Example 1

RBD soybean oil (~780 kg) was charged to an agitated 2600 L vessel. The vessel and soybean oil were then sparged with Ar gas overnight. The soybean oil was then heated to a temperature of 70° C. and 39 grams (50 ppm) of C827 ruthenium metathesis catalyst was added to the soybean oil to initiate the metathesis reaction. The agitated vessel was operated with a slight head pressure (~2 psig) of Ar gas. The metathesis reaction was allowed to proceed for two hours. Following this, the metathesized oil was held in the vessel for an additional 4-5 hours. Following this, the metathesized oil was transferred to an agitated holding tank in preparation for hydrogenation. The metathesized oil was then split into four approximately equal batches for hydrogenation in order to accommodate the 300 L agitated, pressure-rated vessel that was available. A loading of 0.4 wt % Ni hydrogenation catalyst (Pricat 9925, from Johnson Matthey) was used for all batches. The reaction conditions for the four hydrogenation batches are summarized in Table 1.

TABLE 1

| Batch | Batch size | Temperature | $H_2$ pressure | Reaction time |
|---|---|---|---|---|
| 1 | 194 kg | 210° C. | 50 psig | 4.0 hr |
| 2 | 193 kg | 175° C. | 90 psig | 4.0 hr |
| 3 | 193 kg | 185° C. | 90 psig | 2.3 hr |
| 4 | 180 kg | 185° C. | 90 psig | 2.7 hr |

The four hydrogenation products were combined in the 2600 L agitated tank in advance of filtration. The combined hydrogenated metathesized oil was held at 70° C. Citric acid (0.1 wt %), bleaching clay (2.0 wt %), and filter aid (0.1 wt %) were mixed with the oil before passing through a plate and frame filter (4×2" frames). A second pass was required due to breakage of one of the filter papers in the first pass. After filtration, 675 kg of hydrogenated metathesized soybean oil was recovered.

Example 2

18,300 pounds of RBD soybean oil (Cargill) was transferred from a tank into a nitrogen purged reaction vessel. Separately, 415 grams (50 ppm catalyst for the final reaction mixture) of C827 metathesis catalyst was slurried in about 4 gallons of soybean oil. The resulting slurry was added to the soybean oil in the reaction vessel which was held at a temperature of 70° C. The reaction mixture was then held in the reaction vessel for a period of about 3 hours. GC analysis of samples of the reaction mixture showed that the reaction mixture reached equilibrium about 30 minutes after addition of the metathesis catalyst.

Next, 27.5 pounds (12.5 kg) of hydrogenation catalyst (PRICAT 9925 from Johnson Matthey) was charged to the vessel. Following addition of the catalyst, the head space in the vessel was charged with $H_2$ gas. During this time, the reaction mixture was heated to 120° C. When the temperature reached 120° C., the $H_2$ gas in the head space was increased to a pressure of 50 psig. The heat of the exothermic reaction was used to raise the temperature of the reaction mixture to 185° C. $H_2$ charging continued for an additional 3 hours. The final IV for the metathesized soybean oil was less than 1.

In the same reaction vessel a steady sparge of steam was introduced to remove the more volatile components by steam stripping. The vessel was cooled during stripping to 120° C. The resulting product was filtered at 120° C. by recirculating the product through a plate and frame filter (Sparkler, Conroe, Tex.) with a pre-coat of about 25 pounds of diatomaceous earth filter aid ("CELATOM FW-14" from EaglePicher Filtration, Reno, Nev.). The final Ru content was less than 0.07 ppm Ru.

Example 3

15,900 pounds of RBD soybean oil (Cargill) was loaded into a reaction vessel. The soybean oil was agitated and was sparged with $N_2$ gas for 2.5 hours at a rate of 50 SCFH. Separately, 361 grams (50 ppm of catalyst in the final reaction mixture) of C827 metathesis catalyst was slurried in about 3 gallons of soybean oil. The resulting slurry was added to the soybean oil in the reaction vessel. Following addition of the catalyst, the head space in the vessel was evacuated and purged with $N_2$ gas a total of 3 times over a period of 1 hour. During this time, the reaction mixture was heated to 71° C. The reaction mixture was then held in the reaction vessel for a period of about 3 hours during which the temperature rose to 76° C. GC analysis of samples of the reaction mixture showed that the reaction mixture reached equilibrium about 30 minutes after addition of the metathesis catalyst.

Next, 35.0 pounds (15.9 kg) of hydrogenation catalyst (PRICAT 9925 from Johnson Matthey) was charged to the vessel. Following addition of the catalyst, the head space in the vessel was evacuated and purged with $N_2$ gas a total of 3 times over a period of 1 hour. During this time, the reaction mixture was heated to 130° C. When the temperature reached 130° C., $H_2$ gas was charged to the vessel. Thirty minutes into hydrogenation the reaction mixture reached a temperature of 180° C. and the flow of hydrogen was stopped for a period of about 75 minutes. After this, the $H_2$ charging resumed for an additional 3 hours during which the temperature ranged between 172° C. and 194° C. The resulting hydrogenated metathesized soybean oil was cooled to a temperature of 84° C. and excess $H_2$ was vented off. The oil was held at about 5 to 8 psig for about 9.5 hours before filtering.

The resulting product was filtered by recirculating the product through a plate and frame filter (Sparker, Conroe, Tex.) with a pre-coat of about 25 pounds of diatomaceous earth filter aid ("CELATOM FW-14" from EaglePicher Filtration, Reno, Nev.). The product was recirculated through the filter for about 13 hours total. Twice during the filtration, the filter was taken apart for cleaning and was conditioned with about 25 pounds of filter aid. During filtration, the product was at a temperature of about 90° C. or less. The final Ru content was less than 0.1 ppm.

Example 4

RBD soybean oil (SBO) was used to prepare metathesized soybean oil. 1500 g of SBO was charged into a 2000 ml Parr reactor. After sealing the Parr reactor, the solution in the reactor was degassed with pressurized $N_2$ (50-100 psi) by pressurizing and releasing $N_2$ gas for 5 cycles. After degassing, 80 mg of C827 metathesis catalyst dissolved in 2 ml $CH_2Cl_2$ was added to the Parr reactor and the resulting solution was degassed again using $N_2$ gas for 3 cycles. Next, the solution in the Parr reactor was heated to 70° C. while mixing at 300 rpm. When the temperature reached 70° C., the mixing rate was increased to 500 rpm and the self-metathesis reaction was allowed to proceed at 70° C. for 3 hours. Following this, the solution in the Parr reactor was allowed to cool to room temperature. The Ru content of the solution was measured using ICP.

General Procedure for Hydrogenation:

For each trial identified in TABLE 2 the following general procedure was followed. 200 g of metathesized SBO (prepared as described above) and the amount of Ni catalyst (PRICAT 9925 from Johnson Matthey) designated in TABLE 2 were charged to a 600 ml Parr reactor. After sealing the Parr reactor, the resulting composition was heated to 80° C. and was degassed with pressurized $N_2$ (50-100 psi, for the control experiment without using $H_2$ in the hydrogenation reaction) or pressurized $H_2$ (50-100 psi) by pressuring and releasing the gas from the Parr reactor for 5 cycles. After degassing, the Parr reactor was pressurized to 100 psi with $H_2$ gas, except for the control experiment in which neither hydrogen nor another gases was used. Then, the composition in the Parr reactor was heated to the desired temperature (see, TABLE 2) while be mixed at 300 rpm. When the desired temperature was reached, a sample of the composition was taken and the sample was filtered at reduced pressure. The filtered composition was analyzed for Ru and Ni levels using ICP. For each trial, this sample was designated as the time 0 (zero) sample. After taking the sample, the composition in the Parr reactor was mixed at 500 rpm while maintaining the desired temperature for 4 hours. Following this, a sample was taken and the sample was filtered at reduced pressure. The filtered sample was analyzed for Ru and Ni levels using ICP. For each trial, this sample was designated as the 4 hour sample.

The hydrogenation conditions and Ru and Ni levels are provided in TABLE 2. Two hydrogen pressures (0 and 100 psi), three reaction temperatures (100, 190 and 250° C.) and two levels of the Ni catalyst (0.1 and 0.5%) were investigated in the hydrogenation experiments. The results are presented in TABLE 2.

The data shows that the hydrogen pressure, reaction temperature, and the amount of Ni catalyst are factors that contribute to Ru metal absorption and removal from the hydrogenated metathesized soybean oil (HMSBO) using the method of the invention. As shown in trials A0 and A4, the process is not effective without hydrogen gas being present. When other conditions were held constant, a higher hydrogenation temperature resulted in a decrease in Ru metal in the HMSBO. For example, 6.7 ppm Ru was obtained at 100° C. (E4); 0.3 ppm was obtained at 190° C. (B4); and 0.2 ppm Ru was obtained at 250° C. (D4). When other conditions were held constant, an increase in the amount of Ni hydrogenation catalyst from 0.1% to 0.5% resulted in a decrease in the Ru content in the HMSBO from 0.6 ppm to 0.3 ppm (see, C4 and B4). The reaction time also influences the Ru removal. The Ru content remained at almost the same as the initial level at the time zero for all the experiments (Exp A0, B0, C0 and E0) except for the trial (Exp D0) at 250° C.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following embodiments.

What is claimed is:

1. A method of making hydrogenated metathesis products comprising the steps of:
   (a) providing a metathesis composition;
   (b) providing a metathesis catalyst comprising a transition metal;
   (c) metathesizing at least a portion of the metathesis composition in the presence of the metathesis catalyst to form a first composition comprising one or more metathesis products and a transition metal;
   (d) hydrogenating at least a portion of the first composition in the presence of a hydrogenation catalyst to form a second composition comprising one or more hydrogenated metathesis products, transition metal, and hydro-

TABLE 2

| | Metathesized SBO | | Hydrogenation Conditions | | | Reaction | HMSBO | |
|---|---|---|---|---|---|---|---|---|
| Exp | Time (hr) | Ru* (ppm) | Ni* (ppm) | $H_2$ (psi) | Temp (° C.) | Ni Cat (%) | Time (hr) | Ru (ppm) | Ni (ppm) |
| A0 | 0 | 6.8 | 1.8 | 0 | 190 | 0.5 | 0.0 | 6.2 | 10.0 |
| A4 | 4 | 6.8 | 1.8 | 0 | 190 | 0.5 | 4.0 | 5.9 | 13.5 |
| B0 | 0 | 6.8 | 1.8 | 100 | 190 | 0.5 | 0.0 | 5.2 | 16.3 |
| B4 | 4 | 6.8 | 1.8 | 100 | 190 | 0.5 | 4.0 | 0.3 | 2.8 |
| C0 | 0 | 6.8 | 1.8 | 100 | 190 | 0.1 | 0.0 | 6.6 | 7.6 |
| C4 | 4 | 6.8 | 1.8 | 100 | 190 | 0.1 | 4.0 | 0.6 | 3.3 |
| D0 | 0 | 6.8 | 1.8 | 100 | 250 | 0.5 | 0.0 | 0.4 | 4.6 |
| D4 | 4 | 6.8 | 1.8 | 100 | 250 | 0.5 | 4.0 | 0.2 | 16.0** |
| E0 | 0 | 6.8 | 1.8 | 100 | 100 | 0.5 | 0.0 | 6.4 | 4.4 |
| E4 | 4 | 6.8 | 1.8 | 100 | 100 | 0.5 | 4.0 | 6.7 | 5.9 |

*The Ru content in the metathesized SBO is 6.8 ppm and the Ni content (1.8 ppm) comes from the contamination of the previous hydrogenation experiments that were conducted in the same Parr reactor.
**The high Ni content (16.0 ppm) in the product solution at 250° C. may be due to a higher solubility of Ni in the product solution.

Observations:

genation catalyst; and removing at least a portion of the hydrogenation catalyst from the second composition, wherein the removal of the hydrogenation catalyst removes at least a portion of the transition metal of the metathesis catalyst from the second composition, wherein the metathesis composition is a polyol ester.

2. The method of claim 1, wherein the metathesis composition is a triacylglyceride.

3. The method of claim 2, wherein the metathesis composition is a vegetable oil.

4. The method of claim 3, wherein the vegetable oil is soybean oil.

5. A method of making hydrogenated metathesis products comprising the steps of:
(a) providing a metathesis composition;
(b) providing a metathesis catalyst comprising a transition metal;
(c) metathesizing at least a portion of the metathesis composition in the presence of the metathesis catalyst to form a first composition comprising one or more metathesis products and a transition metal;
(d) hydrogenating at least a portion of the first composition in the presence of a hydrogenation catalyst to form a second composition comprising one or more hydrogenated metathesis products, transition metal, and hydrogenation catalyst; and removing at least a portion of the hydrogenation catalyst from the second composition, wherein the removal of the hydrogenation catalyst removes at least a portion of the transition metal of the metathesis catalyst from the second composition, wherein the metathesis catalyst is a metal carbene catalyst based upon a transition metal.

6. The method of claim 5, wherein the transition metal is ruthenium, molybdenum, osmium, chromium, rhenium, or tungsten.

7. The method of claim 6, wherein the transition metal is ruthenium.

8. The method of claim 7, wherein the metathesis catalyst is selected from the group of:

C823

C827

C627

C712

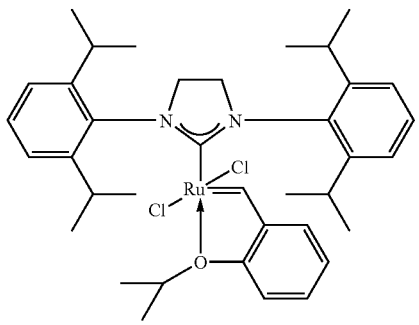

C697

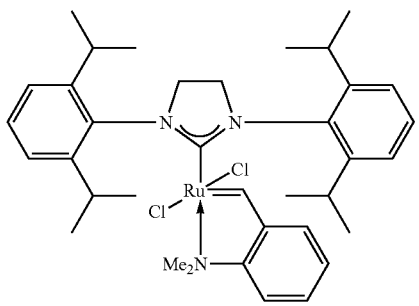

C682

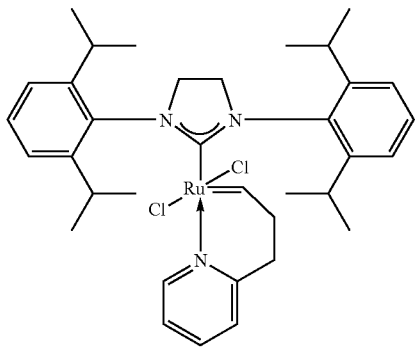

12

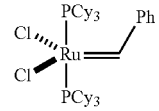

14

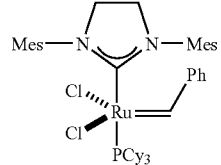

16

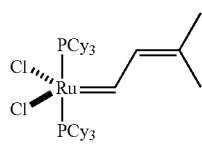

18

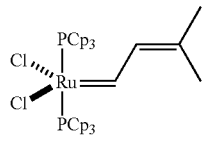

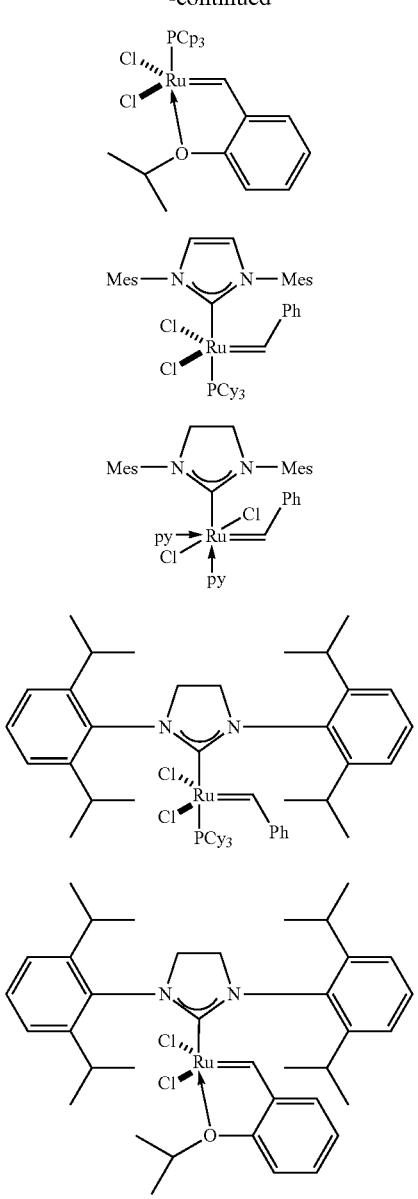

where Ph is phenyl, Mes is mesityl, py is pyridine, Cp is cyclopentyl, and Cy is cyclohexyl.

9. A method of making hydrogenated metathesis products comprising the steps of:
   (a) providing a metathesis composition;
   (b) providing a metathesis catalyst comprising a transition metal;
   (c) metathesizing at least a portion of the metathesis composition in the presence of the metathesis catalyst to form a first composition comprising one or more metathesis products and a transition metal;
   (d) hydrogenating at least a portion of the first composition in the presence of a hydrogenation catalyst to form a second composition comprising one or more hydrogenated metathesis products, transition metal, and hydrogenation catalyst; and removing at least a portion of the hydrogenation catalyst from the second composition, wherein the removal of the hydrogenation catalyst removes at least a portion of the transition metal of the metathesis catalyst from the second composition, wherein the hydrogenation catalyst is a homogeneous catalyst or a heterogeneous catalyst.

10. The method of claim 9, wherein the hydrogenation catalyst comprises nickel, copper, palladium, or platinum.

11. The method of claim 10, wherein the hydrogenation catalyst comprises nickel, copper, palladium, or platinum on a silica support.

12. The method of claim 10, wherein the hydrogenation catalyst comprises nickel, copper, palladium, or platinum on an alumina support.

13. The method of claim 10, wherein the hydrogenation catalyst comprises nickel, copper, palladium, or platinum on an alumina/silica support.

14. The method of claim 10, wherein the hydrogenation catalyst comprises nickel, copper, palladium, or platinum on a carbon support.

15. A method of making hydrogenated metathesis products comprising the steps of:
   (a) providing a metathesis composition;
   (b) providing a metathesis catalyst comprising a transition metal;
   (c) metathesizing at least a portion of the metathesis composition in the presence of the metathesis catalyst to form a first composition comprising one or more metathesis products and a transition metal;
   (d) hydrogenating at least a portion of the first composition in the presence of a hydrogenation catalyst to form a second composition comprising one or more hydrogenated metathesis products, transition metal, and hydrogenation catalyst; and removing at least a portion of the hydrogenation catalyst from the second composition, wherein the removal of the hydrogenation catalyst removes at least a portion of the transition metal of the metathesis catalyst from the second composition, wherein the one or more hydrogenated metathesis products contains about 100 ppm or less of the metathesis catalyst transition metal.

16. The method of claim 15, wherein the hydrogenated metathesis products contains about 10 ppm or less of the metathesis catalyst transition metal.

17. The method of claim 15, wherein the hydrogenated metathesis product contains about 1 ppm or less of the metathesis catalyst transition metal.

18. The method of claim 15, wherein the hydrogenated metathesis product contains about 0.1 ppm or less of the metathesis catalyst transition metal.

19. The method of claim 1, wherein the metathesis is self-metathesis, cross-metathesis, ring-opening metathesis, ring-opening metathesis polymerizations (ROMP), ring-closing metathesis (RCM), or acyclic diene metathesis (ADMET).

20. The method of claim 7, wherein the metathesis catalyst is

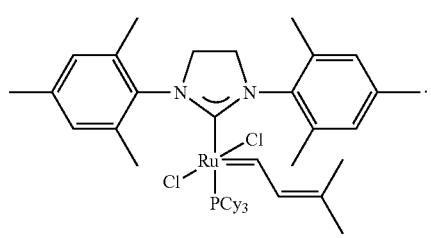

where Cy is cyclohexyl.

21. The method of claim 1, wherein the hydrogenated metathesis product comprises a wax.

22. A method of making hydrogenated metathesis products comprising the steps of:
(a) providing a metathesis composition;
(b) providing a metathesis catalyst comprising a transition metal;
(c) metathesizing at least a portion of the metathesis composition in the presence of the metathesis catalyst to form a first composition comprising one or more metathesis products and a transition metal;
(d) hydrogenating at least a portion of the first composition in the presence of a hydrogenation catalyst to form a second composition comprising one or more hydrogenated metathesis products, transition metal, and hydrogenation catalyst; and removing at least a portion of the hydrogenation catalyst from the second composition, wherein the removal of the hydrogenation catalyst removes at least a portion of the transition metal of the metathesis catalyst from the second composition, wherein the hydrogenated metathesis product is partially hydrogenated or fully hydrogenated.

23. A method of making hydrogenated metathesis products comprising the steps of:
(a) providing a metathesis composition;
(b) providing a metathesis catalyst comprising a transition metal;
(c) metathesizing at least a portion of the metathesis composition in the presence of the metathesis catalyst to form a first composition comprising one or more metathesis products and a transition metal;
(d) hydrogenating at least a portion of the first composition in the presence of a hydrogenation catalyst to form a second composition comprising one or more hydrogenated metathesis products, transition metal, and hydrogenation catalyst; and removing at least a portion of the hydrogenation catalyst from the second composition, wherein the removal of the hydrogenation catalyst removes at least a portion of the transition metal of the metathesis catalyst from the second composition, wherein the hydrogenation step is conducted at a temperature of about 20° C. to about 250° C.

24. The method of claim 23, wherein the hydrogenation step is conducted at a temperature of about 120° C. to 220° C.

25. A method of making hydrogenated metathesis products comprising the steps of:
(a) providing a metathesis composition;
(b) providing a metathesis catalyst comprising a transition metal;
(c) metathesizing at least a portion of the metathesis composition in the presence of the metathesis catalyst to form a first composition comprising one or more metathesis products and a transition metal;
(d) hydrogenating at least a portion of the first composition in the presence of a hydrogenation catalyst to form a second composition comprising one or more hydrogenated metathesis products, transition metal, and hydrogenation catalyst; and removing at least a portion of the hydrogenation catalyst from the second composition, wherein the removal of the hydrogenation catalyst removes at least a portion of the transition metal of the metathesis catalyst from the second composition, wherein the hydrogenation step is conducted at a hydrogen pressure of about 15 to about 3000 psig.

26. The method of claim 25, wherein the hydrogenation step is conducted at a hydrogen gas pressure of about 40 to about 100 psig.

* * * * *